United States Patent
Miyazaki et al.

(10) Patent No.: US 11,378,496 B2
(45) Date of Patent: Jul. 5, 2022

(54) DEVICE WITH SAMPLE TEMPERATURE ADJUSTMENT FUNCTION

(71) Applicant: SHIMADZU CORPORATION, Kyoto (JP)

(72) Inventors: Koki Miyazaki, Kyoto (JP); Shinji Tanaka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/059,667

(22) PCT Filed: Jun. 18, 2018

(86) PCT No.: PCT/JP2018/023088
§ 371 (c)(1),
(2) Date: Nov. 30, 2020

(87) PCT Pub. No.: WO2019/244198
PCT Pub. Date: Dec. 26, 2019

(65) Prior Publication Data
US 2021/0208034 A1    Jul. 8, 2021

(51) Int. Cl.
*G01N 1/28* (2006.01)
*G01N 30/06* (2006.01)
(Continued)

(52) U.S. Cl.
CPC ............. *G01N 1/28* (2013.01); *G01N 30/06* (2013.01); *G01N 30/24* (2013.01); *G01N 2030/027* (2013.01)

(58) Field of Classification Search
CPC .......... G01N 2035/00445; G01N 2035/00356; G01N 2035/00386; G01N 2035/00455;
(Continued)

(56) References Cited

U.S. PATENT DOCUMENTS

2014/0250938 A1*  9/2014  Tanaka ................. F25B 21/02
                                                          62/303
2015/0003494 A1*  1/2015  Yokoyama ............. G01N 1/44
                                                          374/55
(Continued)

FOREIGN PATENT DOCUMENTS

CN     102213965 A    10/2011
JP    1987111554 U9    7/1987
(Continued)

OTHER PUBLICATIONS

International Search Report for corresponding Application No. PCT/JP2018/023088, dated Sep. 18, 2018.
(Continued)

*Primary Examiner* — John Fitzgerald
*Assistant Examiner* — Truong D Phan
(74) *Attorney, Agent, or Firm* — Renner, Otto, Boisselle & Sklar, LLP

(57) ABSTRACT

A device includes a sample rack having a mounting region for mounting a sample plate that holds a sample, a housing in which a temperature adjustment space for adjusting a temperature of the sample plate mounted on the sample rack while accommodating the sample rack inside is provided therein, and the housing having, in a lateral surface, a rack insertion opening through which the sample rack is inserted into the temperature adjustment space; and an air temperature adjustment part having an air intake port for taking in air in the temperature adjustment space, a temperature adjustment element for cooling or heating air taken in from the air intake portion, and an outlet for blowing out air cooled or heated by the temperature adjustment element.

8 Claims, 2 Drawing Sheets

(51) Int. Cl.
*G01N 30/24* (2006.01)
*G01N 30/02* (2006.01)

(58) Field of Classification Search
CPC ............ G01N 25/145; G01N 25/4826; G01N 2035/00346; G01N 2035/00801; G01N 2035/0413; G01N 2035/0415; G01N 15/0806; G01N 23/20025; G01N 25/486; G01N 30/6047; G01N 2203/0447; G01N 2223/309; G01N 2223/31; G01N 1/28; G01N 2030/027; G01N 2030/3084; G01N 2035/0412; G01N 30/06; G01N 30/24; G01N 35/00
See application file for complete search history.

(56) References Cited

U.S. PATENT DOCUMENTS

2015/0346069 A1* 12/2015 Inoue .................. G01N 30/16
73/863.11
2016/0274011 A1    9/2016 Maeda
2017/0294069 A1* 10/2017 Fan .......................... F25D 17/06

FOREIGN PATENT DOCUMENTS

| JP | 11344432 A | 12/1999 |
| JP | 2015010857 A | 1/2015 |
| JP | 2016-176749 A | 10/2016 |
| JP | 2017003477 | 1/2017 |
| JP | 2017053561 A | 3/2017 |
| WO | 2015162680 A1 | 10/2015 |

OTHER PUBLICATIONS

Written Opinion for corresponding Application No. PCT/JP2018/023088, dated Sep. 18, 2018 (Machine translation).
Office Action for corresponding JP Application No. 2020-525085 dated Nov. 16, 2021, with English language translation.
Office Action for corresponding JP Application No. 2020-525085 dated Mar. 22, 2022, with English language translation.

* cited by examiner

DEVICE WITH SAMPLE TEMPERATURE ADJUSTMENT FUNCTION

TECHNICAL FIELD

The present invention relates to a device with a sample temperature adjustment function, which is used in an analysis device, such as a liquid chromatograph, and adjusts a temperature while cooling or heating a sample plate holding a sample.

BACKGROUND ART

Some liquid chromatograph autosamplers have a function of cooling or heating a sample plate containing a sample to be analyzed and adjusting the temperature to a constant temperature in order to prevent alteration or the like of the sample (for example, see Patent Document 1).

Temperature adjustment systems of a sample include a direct temperature adjustment system in which a sample plate mounted with a sample is disposed on a metal plate to which a temperature adjustment element, such as a Peltier element or a heater, is attached and a container is directly cooled or heated (see Patent Document 1), and an air temperature adjustment system in which a sample plate is disposed in space (hereinafter referred to as temperature adjustment space) thermally separated from outside air, and air in the temperature adjustment space is cooled or heated by a temperature adjustment element, such as a Peltier element.

PRIOR ART DOCUMENTS

Patent Documents

Patent Document 1: Japanese Patent Laid-open Publication No. 2016-176749

SUMMARY OF THE INVENTION

Problems to be Solved by the Invention

While the direct temperature adjustment system, which directly cools or heats the sample plate, has an advantage that the response speed of the temperature adjustment is excellent, there is a problem that it is difficult to uniformly adjust the temperature of the entire surface of the sample plate. In the air temperature adjustment system, which is inferior to the direct temperature adjustment system in the response speed of temperature adjustment, the temperature of a sample plate can be adjusted uniformly as compared with the direct temperature adjustment system since the temperature adjustment space in which the sample plate is disposed is cooled or heated entirely.

However, when an attempt is made to adjust the temperature in the temperature adjustment space entirely, the area to perform heat exchange between the inside and outside of the temperature adjustment space becomes large, and a large amount of heat insulating material needs to be used to shield the temperature adjustment space from the outside air. Further, since the temperature of a structure in the temperature adjustment space, which originally does not require temperature adjustment, is adjusted, the heat capacity of the temperature adjustment target becomes large, and there is a problem of inefficiency, such as that the time required for temperature adjustment of the sample becomes long or a temperature adjustment element with excessively high temperature adjustment capability is required. Furthermore, the above leads to an increase in the size of the device and an increase in the cost of the device.

In view of the above, an object of the present invention is to provide a device capable of uniformly and highly efficiently adjusting the temperature of a sample plate that holds a sample.

Solutions to the Problems

The device according to the present invention includes a sample rack having a mounting region for mounting a sample plate for holding a sample, a temperature adjustment space for adjusting the temperature of a sample plate mounted on the sample rack while accommodating the sample rack inside, and an air temperature adjustment part having an air intake port for taking in air in the temperature adjustment space, a temperature adjustment element for cooling or heating air taken in from the air intake portion, and an outlet for blowing out air cooled or heated by the temperature adjustment element. In the device, an air passage through which air flows is further formed between the bottom surface of the mounting region of the sample rack and the floor surface of the temperature adjustment space in a state where the sample rack is accommodated in the temperature adjustment space, and air blown out from the outlet of the air temperature adjustment part is directly introduced into the air passage between a bottom surface of the mounting region of the sample rack accommodated in the temperature adjustment space and a floor surface of the temperature adjustment space, and flows from one end to the other end of the mounting region through the air passage.

Here, that air blown out from the outlet of the air temperature adjustment part is "directly" introduced into the air passage between a bottom surface of the mounting region of the sample rack and a floor surface of the temperature adjustment space means that air cooled or heated by the temperature adjustment element in the air temperature adjustment part is introduced into the air passage between a bottom surface of the mounting region of the sample rack and a floor surface of the temperature adjustment space by hardly exchanging heat with other structures, that is, by hardly changing its temperature. With this structure, air that is temperature-adjusted in the air temperature adjustment part intensively exchanges heat with the sample plate mounted in the mounting region of the sample rack, so that the temperature adjustment of the sample plate can be performed uniformly and highly efficiently. Since heat exchange does not need to be performed actively for a structure unrelated to a sample by temperature-adjusted air, the temperature adjustment capability of the temperature adjustment element can be reduced as compared with the case where the temperature of the entire temperature adjustment space is uniformly adjusted, and cost reduction and energy saving can be achieved.

In a preferred embodiment, the air temperature adjustment part includes, at the outlet, a hood for guiding air cooled or heated by the temperature adjustment element to the air passage.

In a more preferred embodiment, the sample rack has an air guide plate at the one end, and as a result of the contact between the air guide plate of the sample rack accommodated in the temperature adjustment space and the hood, a path for guiding air cooled or heated by the temperature adjustment element to the air passage is formed.

From the viewpoint of allowing heat exchange to be actively performed between air for temperature adjustment and the sample plate mounted on the sample rack, the sample rack is preferably made from a metal material such as aluminum having high thermal conductivity. However, if the sample rack is made from such a metal material, dew condensation is likely to occur on the sample rack in a case where cooling temperature adjustment of the sample plate is performed.

In view of the above, the configuration may be such that the mounting region of the sample rack that is in direct contact with the temperature-adjusted air is made from resin, and an opening for allowing air flowing through the air passage to be in contact with the sample plate mounted on the mounting region is provided in the mounting region of the sample rack. In this manner, it is possible to allow heat exchange to be actively performed between air for temperature adjustment and the sample plate while suppressing the occurrence of dew condensation on the sample rack.

Air for temperature adjustment flowing from one end to the other end of the mounting region of the sample rack through the air passage formed between the sample rack and a floor surface of the temperature adjustment space exchanges heat in order from the one end side of the sample rack. Therefore, the heat exchange efficiency with the sample plate deteriorates toward the other end side of the sample rack. For this reason, in a case where an opening is provided in the mounting region of the sample rack, if the ratio of the openings in the mounting region of the sample rack is made equal between a region on the one end side and a region on the other end side, it is conceivable that there will be a temperature difference between the region on the one end side and the region on the other end side. In view of the above, the area occupation rate of the openings in the mounting region of the sample rack is preferably larger in the region on the other end side far from the outlet of the air temperature adjustment part than in the region on the one end side near the outlet of the air temperature adjustment part. In this manner, the heat exchange efficiency between air for temperature adjustment and the sample plate can be made uniform in the region on the one end side and the region on the other end side of the mounting region of the sample rack.

Further, as the sample rack, one in which different sample plates can be mounted in the region on the one end side and the region on the other end side of the mounting region can be used. In a case where only part of sample plates is used in spite of using such a sample rack, no sample plate is mounted in the region on the one end side or the region on the other end side of the sample rack. In order to improve the heat exchange efficiency between air for temperature adjustment and the sample plate, it is effective to increase the ratio of the opening area in the mounting region. However, in a case where no sample plate is mounted on the region on the one end side of the mounting region and if a large opening is formed in the region, the air for temperature adjustment escapes from that opening, the air for temperature adjustment does not reach the region on the other end side, and temperature adjustment of the mounted sample plate cannot be performed effectively.

In view of the above, the area occupation rate of the opening in the region on the one end side of the mounting region of the sample rack is preferably set to the size by which the air passage is substantially formed even if the sample plate is not mounted on the region on the one end side. In this manner, even in a case where the sample plate is not mounted in the region on the one end side, the air passage through which air for temperature adjustment flows is substantially formed, so that the air for temperature adjustment reaches the region on the other end side, and temperature adjustment of the sample plate mounted on the region on the other end side can be performed effectively.

The present invention can be applied to an autosampler for a liquid chromatograph.

Effects of the Invention

The device according to the present invention is configured so that, in a state where the sample rack is accommodated in the temperature adjustment space, air blown out from the outlet of the air temperature adjustment part is introduced directly into the air passage between a bottom surface of the mounting region of the sample rack accommodated in the temperature adjustment space and a floor surface of the temperature adjustment space and flows from one end to the other end of the mounting region of the sample rack through the air passage. Accordingly, air for temperature adjustment can exchange heat intensively with the sample plate mounted on the sample rack, and the temperature adjustment of the sample plate can be performed uniformly and with high efficiency.

EMBODIMENT OF THE INVENTION

Hereinafter, an embodiment of a device according to the present invention will be described with reference to the accompanying drawings.

Figure 1:
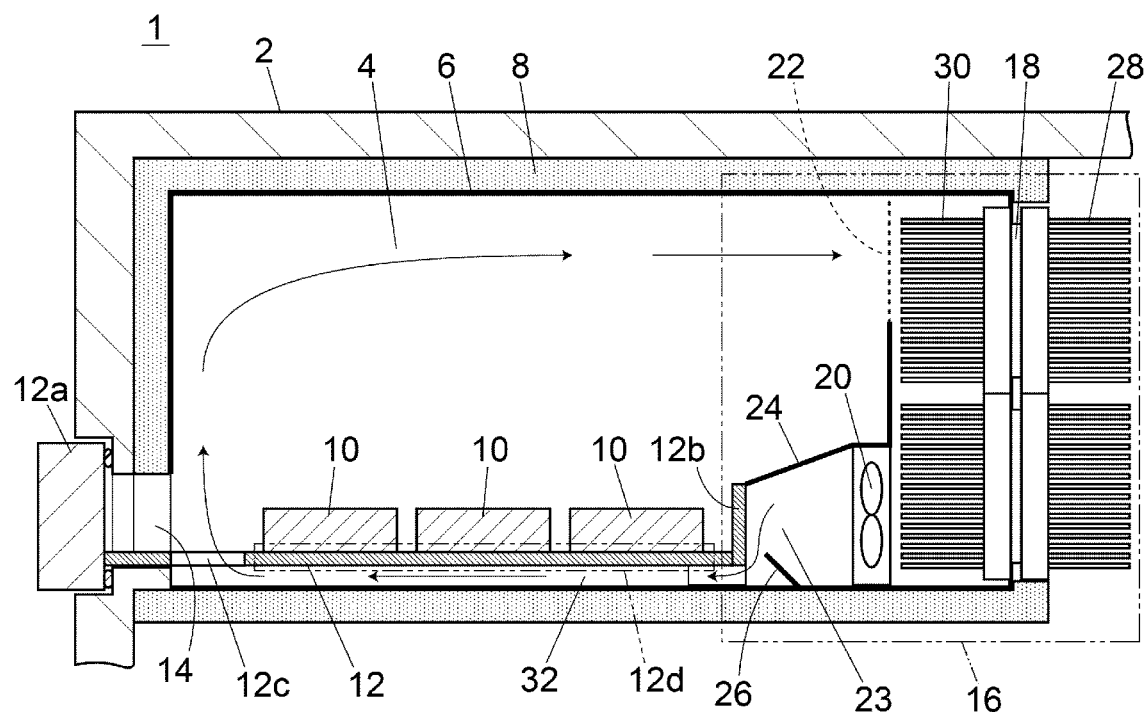
FIG. 1 is a schematic cross-sectional configuration diagram showing an embodiment of a device having a sample temperature adjustment function.

As shown in FIG. 1, a device 1 includes temperature adjustment space 4 inside a housing 2. Temperature adjustment space 4 is defined by sheet metal 6, and an outer peripheral surface of the sheet metal 6 is covered with a heat insulating layer 8 made from, for example, a polyethylene resin foam material or the like, except for a rear surface side (right side in FIG. 1) on which an air temperature adjustment part 16 is provided.

A sample plate 10 holding a sample is placed on the bottom of the temperature adjustment space 4 in a state of being mounted on a sample rack 12. Note that the sample plate 10 may hold a plurality of vials containing a sample, or may have a plurality of wells containing a sample on a top surface. On a front side (left side in FIG. 1) which is one side of the housing 2, there is provided a rack insertion opening 14 which is an opening for inserting the sample rack 12 from one end side to be accommodated in the temperature adjustment space 4.

The other end of the sample rack 12 is provided with a handle 12a for holding the sample rack 12. Packing is attached to a peripheral edge of a surface facing the housing 2 (surface on the right side in the diagram) of the handle 12a, and when the sample rack 12 is inserted from the one end side into the temperature adjustment space 4, the packing of the handle 12a abuts on an edge of the rack insertion opening 14 so that sealing property of the rack insertion opening 14 is maintained.

The sample rack 12 has a mounting region 12d for mounting the sample plate 10. In the present embodiment, the sample plate 10 can be mounted in each of a region on one end side, a center region, and a region on the other end side of the mounting region 12d of the sample rack 12. The sample rack 12 is accommodated in the temperature adjustment space 4 with a gap between a plate material on which the mounting region 12d is formed and a floor surface of the temperature adjustment space 4 so that an air passage 32 through which air flows is formed between a bottom surface of the mounting region 12d and the floor surface of the temperature adjustment space 4.

An air guide plate 12b is provided in one end portion of the sample rack 12. The air guide plate 12b is provided, for example, to extend vertically upward from one end of the sample rack 12. The air guide plate 12b is for guiding cooled air together with a hood 24, described later, to the air passage 32. An opening 12c for allowing air flowing through the air passage 32 to escape upward is provided closer to the other end side than the mounting region 12d of the sample rack 12.

The air temperature adjustment part 16 is provided on a back surface side of the housing 2. The air temperature adjustment part 16 includes a Peltier element 18 which is a temperature adjustment element, a fan 20, an air intake portion 22, the hood 24, an outlet 23, a rising guide 26, and heat exchange fins 28 and 30. The air temperature adjustment part 16 is configured to take in air in the temperature adjustment space 4 from the air intake portion 22, and cool or heat the intake air with the Peltier element 18 and blow the air out from the outlet 23.

The Peltier element 18 is provided so that one heat transfer surface is disposed inside the temperature adjustment space 4, and the other heat transfer surface is disposed outside the temperature adjustment space 4, the heat exchange fin 30 is attached to the one heat transfer surface of the Peltier element 18, and the heat exchange fin 28 is attached to the other heat transfer surface of the Peltier element 18. The fan 20 is provided to blow air from the outlet toward a front side of the housing 2 in a lower portion in the temperature adjustment space 4. The air intake portion 22 is an opening for intake provided near the air intake portion in the temperature adjustment space 4.

The hood 24 and the rising guide 26 are provided in the outlet 23 of the air temperature adjustment part 16. The hood 24 is provided to guide air for temperature adjustment blown by the fan 20 to the air passage 32 between the lower surface of the sample rack 12 and the floor surface of the temperature adjustment space 4 together with the air guide plate 12b of the sample rack 12 accommodated in the temperature adjustment space 4. The rising guide 26 is provided so as to guide the air blown by the fan 20 to an upper portion in the temperature adjustment space 4 when the sample rack 12 is pulled out from the temperature adjustment space.

When the sample rack 12 is accommodated in the temperature adjustment space 4, the upward air flow is blocked by the air guide plate 12b and the hood 24, so the rising guide 26 does not function. For this reason, in a state where the sample rack 12 is accommodated in the temperature adjustment space 4, air taken in from the air intake portion 22 and cooled or heated by the Peltier element 18 takes a circulation path, in which the air flows through the air passage 32, escapes upward from the opening 12c of the sample rack 12, and is taken in again from the air intake portion 22, as shown by an arrow in FIG. 1.

Figure 2:
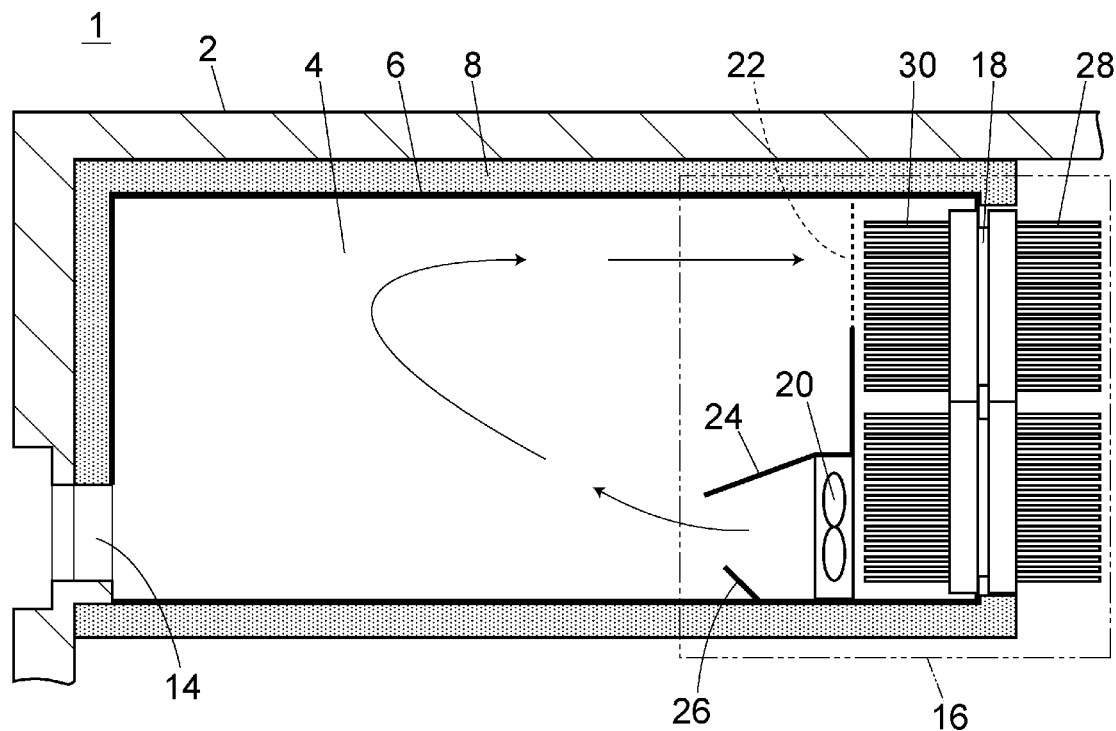
FIG. 2 is a cross-sectional view for explaining flow of air in temperature adjustment space when a sample rack is pulled out in the embodiment.

On the other hand, as shown in FIG. 2, when the sample rack 12 is pulled out of the temperature adjustment space 4, the rising guide 26 functions. Air blown by the fan 20 takes a circulation path, in which the air rises to an upper portion in the temperature adjustment space 4 by the rising guide 26 and is taken in again from the air intake portion 22. In this manner, flow of air in the vicinity of the rack insertion opening 14 is reduced, and inflow and outflow of air through the rack insertion opening 14 is suppressed.

Figure 3:
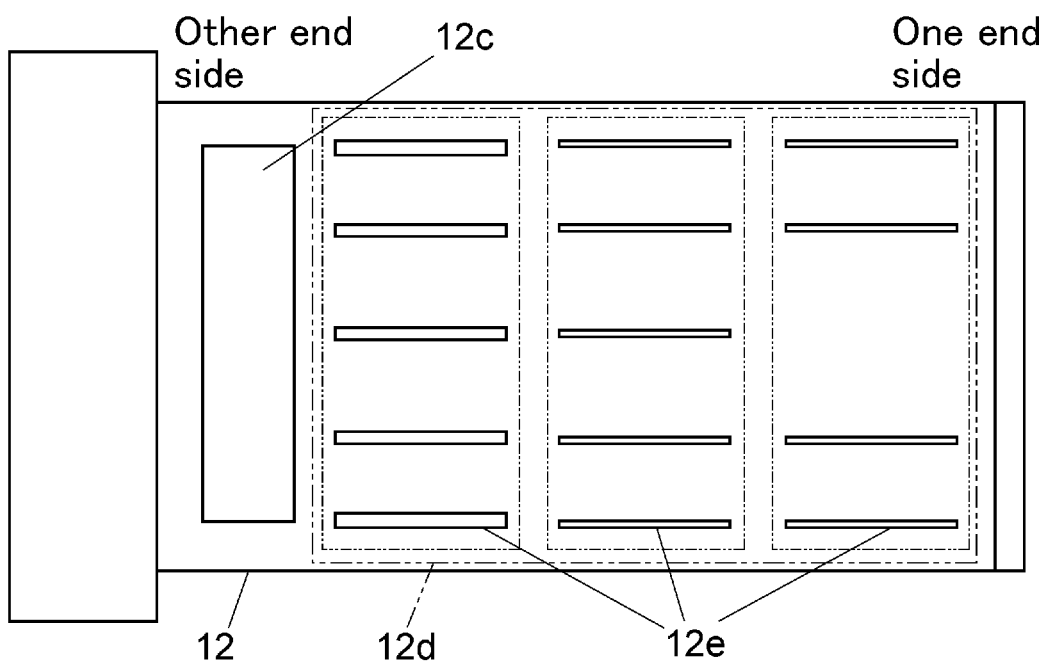
FIG. 3 is a plan view of the sample rack on which a sample plate is not mounted.

Further, in the present embodiment, the plate material constituting the mounting region 12d of the sample rack 12 is made from resin. For this reason, as shown in FIG. 3, the mounting region 12d of the sample rack 12 is provided with an opening 12e for bringing the air for temperature adjustment flowing through the air passage 32 into contact with the sample plate 10 mounted in the mounting region 12d, and the air for temperature adjustment and the sample plate 10 directly exchange heat.

An area occupation rate occupied by the opening 12e is different between each of the region on the one end side, the center region, and the region on the other end side of the mounting region 12d, and the ratio is smallest in the region on the one end side of the mounting region 12d, and the ratio is largest in the region on the other end side. An area occupation rate of the opening 12 in each of the region on the one end side, the center region, and the region on the other end side of the mounting region 12d is designed so that heat exchange efficiency between the air for temperature adjustment flowing through the air passage 32 and the sample plate 10 is substantially uniform in the regions from the one end side to the other end side of the mounting region 12d.

Further, the size of the opening 12e in the region on the one end side and the center region of the mounting region 12d is designed to be the size by which the air passage 32 is substantially formed even if the sample plate 10 is not mounted in these regions, that is, the size by which most of the air for temperature adjustment reaches the other end side of the mounting region 12d without escaping from the opening 12e even if the sample plate 10 is not mounted in these regions. In this manner, even in a case where the sample plate 10 is mounted only in part of the mounting region 12d of the sample rack 12, the temperature adjustment of the sample plate 10 can be performed in a similar manner regardless of the mounting position.

Note that, in the above embodiment, three of the sample plates 10 can be mounted in the mounting region of the sample rack 12. However, the present invention is not limited to this, and two or less or four or more of the sample plates 10 may be mounted.

Further, in FIG. 3, the opening e of the mounting region 12d of the sample rack 12 has a slit shape parallel to the longitudinal direction of the sample rack 12. However, the present invention is not limited to this, and the opening e may have any shape.

Further, the device 1 of the above embodiment is realized by, for example, an autosampler for a liquid chromatograph. When the device 1 is an autosampler, a needle or a syringe pump for sucking a sample held by the sample plate 10, a drive mechanism for moving the needle, and the like are also provided in the temperature adjustment space 4.

DESCRIPTION OF REFERENCE SIGNS

1: Device
2: Housing
4: Temperature adjustment space
6: Sheet metal
8: Heat insulating layer
10: Sample rack 12: Sample plate
12a: Handle
12b: Air guide plate
12c, 12e: Opening
12d: Mounting region
14: Rack insertion portion
16: Air temperature adjustment part
18: Peltier element
20: Fan
22: Air intake portion
23: Outlet
24: Hood
26: Rising guide
28, 30: Heat exchange fin
32: Air passage

The invention claimed is:

1. A device comprising:
a sample rack having a mounting region for mounting a sample plate that holds a sample;
a housing in which a temperature adjustment space for adjusting a temperature of the sample plate mounted on the sample rack while accommodating the sample rack inside is provided therein, and the housing having, in a lateral surface, a rack insertion opening through which the sample rack is inserted into the temperature adjustment space; and
an air temperature adjustment part having an air intake portion for taking in air in the temperature adjustment space, a temperature adjustment element for cooling or heating air taken in from the air intake portion, and an outlet for blowing out air cooled or heated by the temperature adjustment element, wherein
an air passage through which air flows is formed between a bottom surface of the mounting region of the sample rack and a floor surface of the temperature adjustment space when the sample rack is inserted into the temperature adjustment space through the rack insertion opening and is accommodated in the temperature adjustment space, the air passage has a width in a height direction narrower than that of the outlet of the air temperature adjustment part,
the air temperature adjustment part is configured so that air blown out from the outlet is directly introduced from one end side of the sample rack into the air passage formed between the bottom surface of the mounting region of the sample rack and the floor surface of the temperature adjustment space,
and the device is configured so that the air introduced into the air passage flows from one end of the mounting region of the sample rack to the other end through the air passage.

2. The device according to claim 1, wherein the device is an autosampler for a liquid chromatograph.

3. The device according to claim 1, wherein the air temperature adjustment part includes, at the outlet, a hood for guiding air cooled or heated by the temperature adjustment element to the air passage.

4. The device according to claim 3, wherein
the sample rack has an air guide plate at the one end, and
as a result of a contact between the air guide plate of the sample rack accommodated in the temperature adjustment space and the hood, a path for guiding air cooled or heated by the temperature adjustment element to the air passage is formed.

5. A device comprising:
a sample rack having a mounting region for mounting a sample plate that holds a sample;
a temperature adjustment space for adjusting a temperature of the sample plate mounted on the sample rack while accommodating the sample rack inside; and
an air temperature adjustment part having an air intake portion for taking in air in the temperature adjustment space, a temperature adjustment element for cooling or heating air taken in from the air intake portion, and an outlet for blowing out air cooled or heated by the temperature adjustment element, wherein
an air passage through which air flows is formed between a bottom surface of the mounting region of the sample rack and a floor surface of the temperature adjustment space in a state where the sample rack is accommodated in the temperature adjustment space,
the device is configured so that air blown out from the outlet of the air temperature adjustment part is directly introduced into the air passage between the bottom surface of the mounting region of the sample rack accommodated in the temperature adjustment space and the floor surface of the temperature adjustment space, and the air flows from one end of the mounting region of the sample rack to the other end through the air passage, and
at least one opening is provided in the mounting region of the sample rack so that air flowing through the air passage comes into contact with a bottom surface of the sample plate mounted on the mounting region.

6. The device according to claim 5, wherein a size of the at least one opening and/or a number of the at least one opening in the mounting region of the sample rack is larger in a region on the other end side than in a region on the one end side.

7. The device according to claim 5, wherein
the sample rack has regions on the one end side and the other end side of the mounting region respectively, and the regions on the one end side and the other end side are configured to be able to mount sample plates individually, and
a size of the at least one opening and/or a number of the at least one opening in the region on the one end side is set to a size by which the air passage is substantially formed even if the sample plate is not mounted.

8. The device according to claim 5, wherein the device is an autosampler for a liquid chromatograph.

* * * * *